Dec. 22, 1953  R. PETTERSON ET AL  2,663,404
SELF-BRAKING CONVEYER DRIVE
Filed Aug. 9, 1951  2 Sheets-Sheet 1
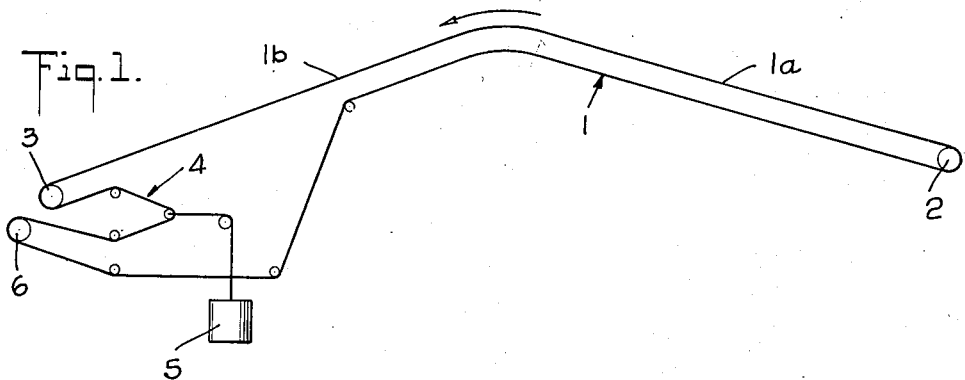
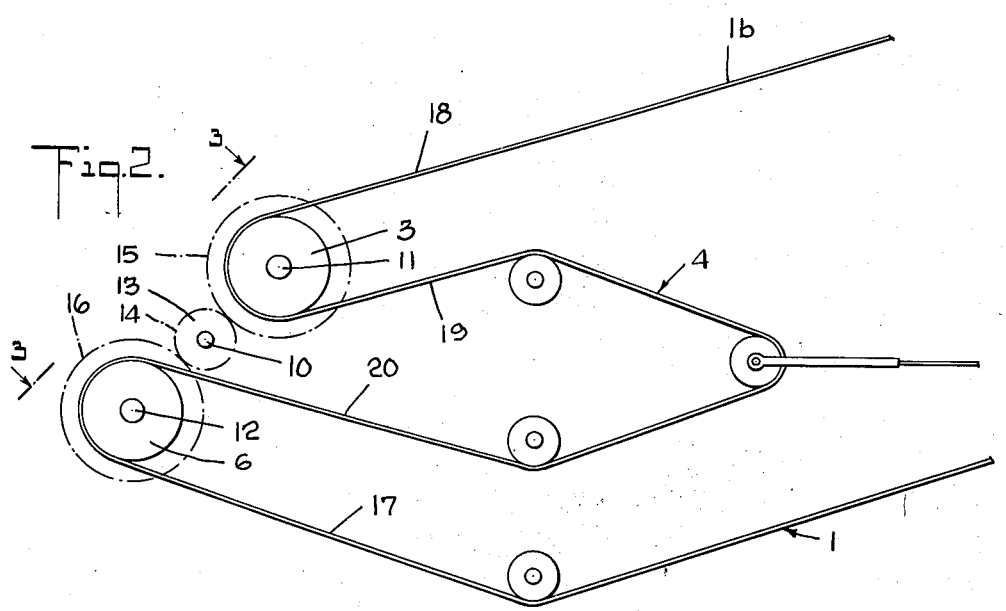
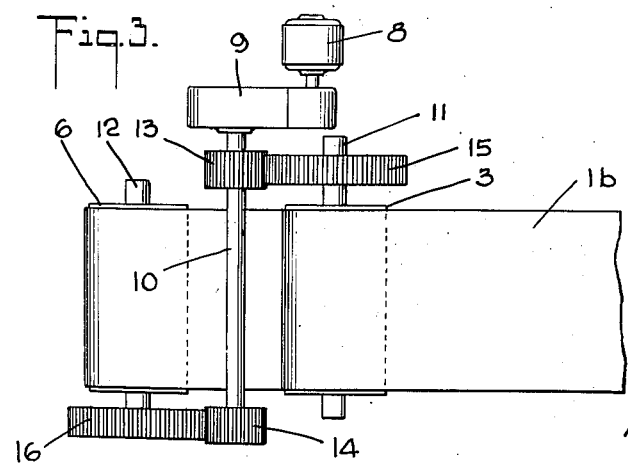
INVENTORS
REINHARDT PETTERSON
LESLIE G. WEYGANDT
BY
Burgess Ryan & Hicks
ATTORNEYS Dec. 22, 1953  R. PETTERSON ET AL  2,663,404
SELF-BRAKING CONVEYER DRIVE
Filed Aug. 9, 1951  2 Sheets-Sheet 2

INVENTORS
REINHARDT PETTERSON
LESLIE G. WEYGANDT
BY
*Burgess Ryan & Hicks*
ATTORNEYS Patented Dec. 22, 1953

2,663,404

UNITED STATES PATENT OFFICE 2,663,404

SELF-BRAKING CONVEYER DRIVE

Reinhardt Petterson, Whitestone, N. Y., and Leslie G. Weygandt, Jenkintown, Pa., assignors to Hewitt-Robins Incorporated, Buffalo, N. Y., a corporation of New York Application August 9, 1951, Serial No. 241,092

8 Claims. (Cl. 198—203)

This invention relates to conveyors and, although its principles are not limited thereto, will be described and exemplified in relation to belt conveyors.

Its general object is to provide a solution for certain difficulties encountered in belt conveyor installations in which, by reason of the contour of the ground or other necessities of the situation, the load is to be conveyed over a path or under such conditions, that at some times the belt, instead of being driven tends to overrun its drive. A simple illustration is an installation in which there is high ground to be surmounted between the head and tail pulleys. At some times (as when starting up) the load or a major part of it will be moving upgrade, and at other times (for example, some time after the feed has been shut down) the load or a major part of it will be moving downgrade, that is toward the head pulley or drive. In this, as well as in more complicated but analogous instances, the usual takeup in the return run of the belt functions normally, in the slack tension side of the belt, while the load is moving upgrade; but, when the load starts to move downgrade and overrun the drive, the return run of the belt, including the takeup, becomes tensioned and the slack normally absorbed in the takeup tends to feed into the upper or load-carrying run of the belt, causing the latter to sag or whip. One way to overcome this difficulty is to overload the takeup, but the resulting tensioning of the belt requires that an extra heavy and hence costly belt be used.

More particularly, therefore, the object of the invention is to provide a conveyor drive which automatically overcomes the indicated difficulty and which does not require the use of extra heavy, costly belts or of additional drive motors.

In general, the invention comprises a drive so organized in relation to the takeup that the latter always operates in a slack tension stretch of the belt or, otherwise stated, is never subjected to tension created in the return run of the belt when the load is tending to overrun the drive.

The invention will be readily understood from the following description and accompanying drawings in which:

Fig. I is a diagrammatic side elevation of a conveyor system incorporating an upgrade and a downgrade stretch and illustrating the general arrangement of head drive pulleys and takeup according to the invention;

Fig. 2 is an enlarged elevational view, also diagrammatic, of the drive or head end of the system;

Figs. 4 and 5 are broken-out elevations showing a preferred arrangement of clutch means under two different conditions of operation.

Figure 3:
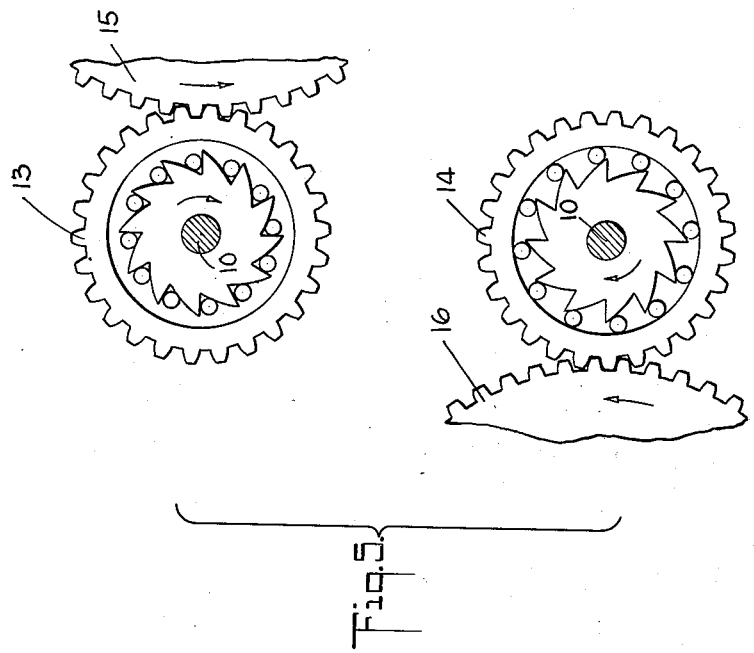
Fig. 3 is a view, on the line 3—3 of Fig. 2, schematically illustrating the drive coupling arrangement.

In the conveyor system schematically illustrated in Fig. 1, the belt 1 is trained over a tail pulley 2 and its upper run is assumed to travel from right to left, toward the motor-driven drive pulley 3 and to surmount a hump or elevation at some intermediate point. Somewhere in the return run of the belt there is ordinarily provided a takeup, herein illustrated conventionally at 4 adjacent the drive pulley 3, a takeup weight being indicated at 5. On the outgoing or downstream side of the takeup, the belt passes over a pulley 6, whence it passes to the tail pulley 2.

When, in such an arrangement, the load or a major part of it is on the upgrade stretch 1a of the belt, the system operates conventionally, with the upper run of the belt tensioned and the takeup operating in the slack tension, return run. But when, for example, the feed to the belt at the tail end is shut down and the belt is advanced to a point where most or all of the load is on the downgrade stretch 1b, the pulley 3, normally motor-driven at constant speed, is overrun and driven by the descending belt load; and the tension created by the load in the stretch of the belt behind or upstream of the load, tensions the normally slack return run, draws the belt out of the takeup loop and passes it into the upper run which then sags or whips.

According to the present invention, means are provided which, under the load conditions last described (that is, when the load tends to overrun the drive pulley) automatically brakes pulley 6 so as to prevent the tension in the return run of the belt from being applied to the takeup. The latter is thereby permitted to function normally and the feeding of surplus belt into the upper run of the conveyor is avoided. For convenience, pulley 6 is referred to hereafter as the holdback pulley.

Referring now to Figs. 2 and 3, a constant speed motor 8, through a suitable drive reduction 9, is coupled to drive a countershaft 10 which is in turn coupled to the shafts 11 and 12, respectively, of pulleys 3 and 6. However, the drives from the countershaft to the respective pulleys incorporate suitable clutches and are so organized that under normal operating conditions (with the drive pulley functioning to haul the belt rather than being overrun by it) the coupling to the holdback pulley is inoperative. The particular details of the clutches form no part of the invention and any type appropriate for the purpose may be used.

Figure 4:
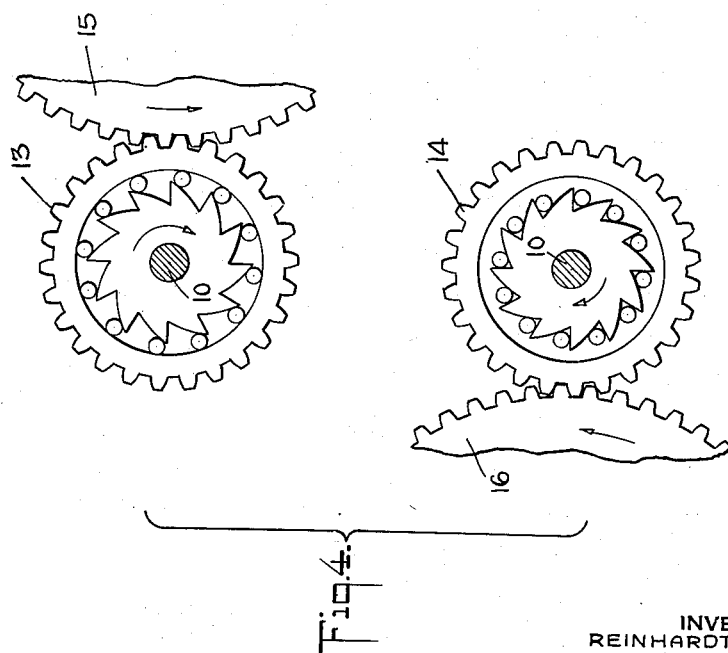

In this present illustrative embodiment, one-way clutches are incorporated in the pinions 13, 14 mounted on the countershaft 10, as indicated in Figs. 4 and 5, the pinions meshing with gears 15, 16 secured to the respective pulley shafts. For convenience, 13 will be referred to as the drive pinion and 14 as the holdback pinion and their respective clutches and gears by like designations. The clutches, being indicated as of conventional form, need not be described in detail. It will be apparent from Figs. 4 and 5 that when drive gear 15 tends to lag behind pinion 13, the motor-driven countershaft 10 is clutched to and drives that pinion; and that when drive gear 15 overruns pinion 13 the drive clutch is thrown out. The oppositely arranged holdback clutch of pinion 14 operates in similar fashion with respect to hold back gear 16.

Before describing the operation of the drive, one further feature may be noted and that is that to ensure engagement and disengagement of the respective clutches at appropriate times, the ratios of the drive connections or couplings between the motor and the respective pulleys are slightly different. This may be achieved by making the drive and holdback pulleys of slightly different diameter or, as is preferred, by incorporating a different number of teeth in one or another of the pinions or gears. For present purposes it may be assumed that holdback pinion 14 has one more tooth than drive pinion 13 with the result that the drive of the motor to the holdback pulley is through a slightly higher gear ratio than the drive of the motor to the drive pulley.

The operation of the system will now be described, and first under what in this illustrative instance amounts to what will be termed normal conditions, that is, when the load or a major part of it is ascending the upgrade stretch.

The motor drives countershaft 10 in the direction of the arrow (Fig. 4) and, through the drive clutch and pinion 13, the drive gear 15. Since the drive pulley and the holdback pulley are induced to rotate at the same speed (by the belt) holdback gear 16 rotates at the same speed as drive gear 15. But since the holdback pinion has one more tooth than the drive pinion, it rotates slower than the drive pinion. The net result is a relative backward movement of the holdback pinion 14, that is, with respect to the countershaft and the holdback clutch is thereby moved to and maintained in its disengaged (Fig. 4) position. In this situation, the takeup is, as usual, on the low or slack tension side of the drive pulley.

When now the condition changes so that the load or a major part of it is descending the downgrade stretch of the conveyor, the drive automatically accommodates itself to this new condition, as follows:

Both the drive pulley and the holdback pulley, driven by the belt under the influence of the descending load, speed up or tend to overrun the motor; or in other words, the direction of power transmission is no longer from the motor to the pulleys but from the pulleys to the motor. The countershaft 10, which is coupled to the motor, tends to maintain its former (motor) speed and, in the result, there is a relative backward movement of the countershaft with respect to the drive pinion and holdback pinion, both of which are now being driven, through the respective gears, at increased speed.

It will be seen (Fig. 5) that such relative backward movement of the countershaft causes the holdback clutch to engage and thus to transmit the drive from the now belt-driven holdback pulley to the motor. It will also be seen that, due to the rotation of drive pinion 13 faster than holdback pinion 14 (because of the one tooth difference), the drive pinion will be disengaged and held disengaged from the countershaft.

The motor is thus driven by the holdback pulley and is speeded up to the point of functioning as a generator and exerting a braking effect upon the holdback pulley, and when that comes about it will be apparent that the lower run of the belt will be tensioned (under the influence of the downgrade load) back to but not beyond the holdback pulley. In other words, referring to Fig. 2, the formerly slack tensioned zone 17 becomes tensioned and the formerly tensioned zone 18 becomes slack; while the formerly slack tensioned zones 19 and 20 continue slack.

Thus, no matter whether the drive pulley is operating under load, or is being overrun by the load, the takeup continues to operate in a slack tension stretch of the belt and hence is not required to be overtensioned or overloaded to prevent the belt in the takeup from being drawn out when the belt load is overrunning the drive pulley.

It will be understood that the location of the drive pulley is not confined to what has been treated above as the head end of the conveyor; but, as in conveyor systems generally, can be located at the tail end or at an intermediate point in the return run of the belt. Wherever located, the drive pulley and holdback pulley are located, as described, on opposite sides and respectively upstream and downstream with respect to the takeup.

It will also be understood that the invention is not limited to the details of the arrangement described and that its principles are susceptible to embodiment in various forms to meet the demands of particular installations.

In the light of the foregoing, the following is claimed:

1. In a conveyor drive, the combination of a drive pulley; a holdback pulley on the downstream side of the drive pulley; a takeup between the said pulleys; a belt trained around the pulleys and through the intervening takeup; a constant-speed drive motor; a drive connection between the motor and the drive pulley including a normally engaged clutch adapted to disengage said connection when the drive pulley overruns the motor; a second drive connection between the holdback pulley and the motor including a normally disengaged clutch adapted to engage the said second drive connection when the holdback pulley overruns the motor.

2. In a conveyor drive, the combination of a drive pulley; a holdback pulley on the downstream side of the drive pulley; a takeup between the said pulleys; a belt trained around the pulleys and through the intervening takeup; a constant-speed drive motor; a one-way drive connection from the motor to the drive pulley; and a one-way drive connection from the holdback pulley to the motor.

3. In a conveyor drive, the combination of a drive pulley; a holdback pulley on the downstream side of the drive pulley; a takeup between the said pulleys; a belt trained around the pulleys and through the intervening takeup; a drive motor and couplings between the motor and each of the pulleys; and clutch means for simultaneously disengaging the coupling between the drive motor and the drive pulley and engaging the coupling between the holdback pulley and the motor, in response to driving of the drive pulley by the belt.

4. In a conveyor drive, the combination of a drive pulley; a holdback pulley on the downstream side of the drive pulley; a takeup between the said pulleys; a belt trained around the pulleys and through the intervening takeup; a drive motor and couplings between the motor and each of the pulleys; said couplings including oppositely arranged overrunning clutches and the drive of the motor-to-holdback-pulley coupling being of higher ratio than that of the motor-to-drive pulley coupling.

5. In a conveyor drive, the combination of a drive pulley; a holdback pulley on the downstream side of the drive pulley; a takeup between the said pulleys; a belt trained around the pulleys and through the intervening takeup; a drive motor and couplings between the motor and each of the pulleys; said couplings including one-way clutches oppositely arranged, whereby when either one of said clutches is engaged the other is disengaged, the one-way clutch in the coupling between the motor and the drive pulley being arranged to transmit the normal drive from the motor to the drive pulley and the one-way clutch in the coupling between the motor and the holdback pulley being arranged to transmit power from the holdback pulley to the motor.

6. The combination with a conveyor belt, a drive pulley therefor and a takeup for the belt on the downstream side of the drive pulley, of: a holdback pulley engaged with the belt on the downstream side of the takeup; braking means; a normally inoperative connection between the braking means and the holdback pulley; and clutch means in said connection adapted to establish the said connection in response to driving of the drive pulley by the belt.

7. The combination with a conveyor belt, a drive pulley therefor and a takeup for the belt on the downstream side of the drive pulley, of: a holdback pulley engaged with the belt on the downstream side of the takeup; holdback pulley braking means; and means whereby the braking means are rendered effective in response to predetermined belt speed.

8. In a conveyor drive, the combination of a drive pulley; a holdback pulley on the downstream side of the drive pulley; a takeup between the said pulleys; a belt trained around the pulleys and through the intervening takeup; and brake means for retarding the holdback pulley in response to the driving of the said pulleys by the belt at a predetermined speed above their normal operating speed.

REINHARDT PETTERSON.
LESLIE G. WEYGANDT.

No references cited.